United States Patent [19]
Moore, Sr.

[11] Patent Number: 5,320,512
[45] Date of Patent: Jun. 14, 1994

[54] APPARATUS FOR SPINNING MULTICOMPONENT HOLLOW FIBERS

[75] Inventor: Samuel E. Moore, Sr., Middletown, Del.

[73] Assignee: E.I. du Pont de Nemours and Company, Wilmington, Del.

[21] Appl. No.: 950,221

[22] Filed: Sep. 24, 1992

[51] Int. Cl.$^5$ .................. B29C 47/26; B29C 47/30
[52] U.S. Cl. .................. 425/131.5; 425/133.1; 425/192 S; 425/462; 425/463; 425/DIG. 217; 264/177.14
[58] Field of Search .................. 425/131.5, DIG. 217, 425/462, 463, 192 S, 725, 133.1; 264/177.13, 177.14

[56] References Cited

U.S. PATENT DOCUMENTS

| | | | |
|---|---|---|---|
| 2,861,319 | 11/1958 | Breen | 28/82 |
| 2,931,091 | 4/1960 | Breen | 28/82 |
| 2,987,797 | 6/1961 | Breen | 28/82 |
| 3,075,241 | 1/1963 | Dietzsch et al. | 425/462 |
| 3,077,091 | 2/1963 | Whitehurst et al. | 65/2 |
| 3,095,258 | 6/1963 | Scott | 425/461 |
| 3,188,689 | 6/1965 | Breen | 425/131.5 |
| 3,341,891 | 9/1967 | Shimizu et al. | 425/462 |
| 3,350,488 | 10/1967 | Breen | 264/171 |
| 3,453,689 | 7/1969 | Hume | 425/131.5 |
| 3,458,615 | 7/1969 | Bragaw et al. | 264/171 |
| 3,459,846 | 8/1969 | Matsui et al. | 264/171 |
| 3,465,618 | 9/1969 | McIntosh et al. | 76/107 |
| 3,500,498 | 3/1970 | Fukuma et al. | 425/131.5 |
| 3,526,571 | 9/1970 | Ogata | 425/131.5 |
| 3,558,420 | 1/1971 | Opfell | 625/461 |
| 3,760,052 | 9/1973 | Fukuma et al. | 264/171 |
| 4,052,146 | 10/1977 | Stornberg | 425/131.5 |
| 4,251,200 | 2/1981 | Parkin | 425/131.5 |
| 4,493,629 | 1/1985 | Goffe | 425/192 S |
| 4,861,661 | 8/1989 | Samuelson | 428/398 |
| 4,980,061 | 12/1990 | Tadros et al. | 210/490 |

FOREIGN PATENT DOCUMENTS

| | | |
|---|---|---|
| 1031522 | 5/1978 | Canada . |
| 55090608 | 12/1978 | Japan . |
| 62-47964 | 10/1987 | Japan . |
| 830441 | 6/1956 | United Kingdom . |
| 1123139 | 5/1967 | United Kingdom . |
| 1150399 | 4/1968 | United Kingdom . |
| 1565155 | 11/1977 | United Kingdom . |

*Primary Examiner*—Khanh Nguyen
*Attorney, Agent, or Firm*—Cary A. Levitt

[57] ABSTRACT

The invention provides a spinnerette assembly for multicomponent hollow fibers of the sheath/core type in which the channel for supplying the sheath material is located at a distance from the extrusion orifice of the spinnerette of no more than one-half of the width of the extrusion orifice. The spinnerette ensures uniform supply of the sheath material to the hollow fiber.

1 Claim, 1 Drawing Sheet

APPARATUS FOR SPINNING MULTICOMPONENT HOLLOW FIBERS

FIELD OF THE INVENTION

This invention relates to spinnerette assemblies for forming hollow fibers. It particularly relates to an improved spinnerette for spinning multicomponent hollow fibers.

BACKGROUND OF THE INVENTION

Numerous spinning assemblies have been devised for the production of hollow fibers, including multicomponent fibers of the sheath/core type. Particularly, devices have been proposed for ensuring uniform supply of homogenous fiber-forming liquid and sheath liquid to the orifices of a spinnerette with the object of producing hollow fibers identical in denier and other characteristics. These spinnerettes use a means for supplying the bore fluid positioned in the spinning orifice for forming the hollow fiber. Usually, a tube is used for this purpose and a fluid is injected from the tube into the bore of the fiber being formed to maintain the shape of the fiber until the polymeric materials making up the fiber are coagulated or solidified.

A typical spinning assembly such as described in U.K. Patent No. 830,441 for a multi-component hollow fiber comprises a front and back plate spaced apart from but facing each other so as to provide a liquid channel there between. The front plate is provided with an extrusion orifice therethrough, and at least one of the plates, on its side facing the other plate, is provided with a plateau-type protrusion so as to constrict the liquid channel in a region surrounding the extrusion orifice entrance and, thus, cause streams of the sheath-forming material to converge substantially radially towards the orifice entrance. A tube is positioned in the orifice entrance to supply the bore fluid. However, a continuing problem is the uniform supply of sheath-forming material to the multicomponent hollow fiber membrane.

Most spinnerettes of this type are made largely by hand, one at a time. As a result, parts made for one spinnerette will not always fit another spinnerette. When parts are not interchangeable, any damage to one part of the spinnerette assembly may render the entire assembly useless.

In assembling or cleaning conventional hollow-fiber spinnerettes, it is very easy to slightly bend the fluid-injection tube, such that it is off center of the spinning orifice. When this happens, the spinnerette cannot be used again.

Another related problem of conventional spinnerettes for multicomponent hollow fibers is that the sheath and core of the hollow fiber are not concentric. Concentricity of the sheath and core are important to obtain uniform fibers. Concentricity of the sheath and core was customarily obtained by adjustment of metering surfaces to regulate (meter) the flow of the polymers. The metering surfaces are produced by closely machining two surfaces so as to produce a narrow opening which will effectively meter polymer at a uniform pressure and rate as it is being extruded. For example, a plateau-type spinnerette is known in the prior art. In addition, U.S. Pat. No. 3,458,615 discloses a method for the circumferential metering of the polymer sheath to be extruded about the polymeric core involving the creation of an annular wedged-shaped flow of sheath polymer around the axially-contained fluid stream.

In order to maintain the concentricity of the sheath and core, other spinnerettes have been provided with members for centering the tube and the bore of the spinnerette plate. For example, U.S. Pat. No. 4,493,629 describes a modular spinnerette assembly fitted with multiple screws threaded through the spinnerette plate to center the tube and orifice of the spinnerette. These adjusting screws are unreliable and are prone to error when the spinnerette is disassembled, cleaned and then reassembled.

Many devices have been proposed for ensuring uniform supply of homogenous sheath-forming liquid to the orifices of a multi-orifice spinnerette with the object of producing multiple hollow fibers with concentric layers, identical in denier and other characteristics. Such devices usually involve variations in the diameter or the location of orifices and single or multiple spinnerette plates. Lack of concentricity and uniformity remain a problem in the manufacture of such multicomponent fibers.

SUMMARY OF THE INVENTION

The present invention provides an improved spinnerette for the production of hollow fibers. According to the present invention, in the production of a synthetic fiber by extruding a sheath-forming liquid through a spinnerette having one or more extrusion orifices, the sheath-forming liquid is caused to flow radially towards each extrusion orifice from all directions in a plane substantially perpendicular to the axis of the orifice in which the thickness of the sheath plate is less than $\frac{1}{2}$ of the diameter of the spinnerette orifice. The spinnerette is simple and easy to manufacture and assemble. It may also easily be disassembled, cleaned and reassembled. The thickness of the sheath, as well as the location of the core within the sheath, is accurately and consistently controlled.

One embodiment of the present invention contemplates a spinnerette that includes a front plate or sheath plate having top and bottom surfaces connected by a throughpass. A capillary plate or main body of the spinnerette is spaced apart from the sheath plate so as to provide a liquid channel for the sheathing material therebetween. At least one of the sheath plates or the main body, on its side facing the other plate, is provided with a plateau-like protrusion so as to constrict the liquid channel in the region surrounding the orifice entrance and, thus, cause the streams of liquid to converge substantially radially towards the orifice entrance.

Rather than having a so-called back plate, the spinnerette of the present invention may have a main body with a press-fit insert.

DETAILED DESCRIPTION OF THE INVENTION

Figure 1:
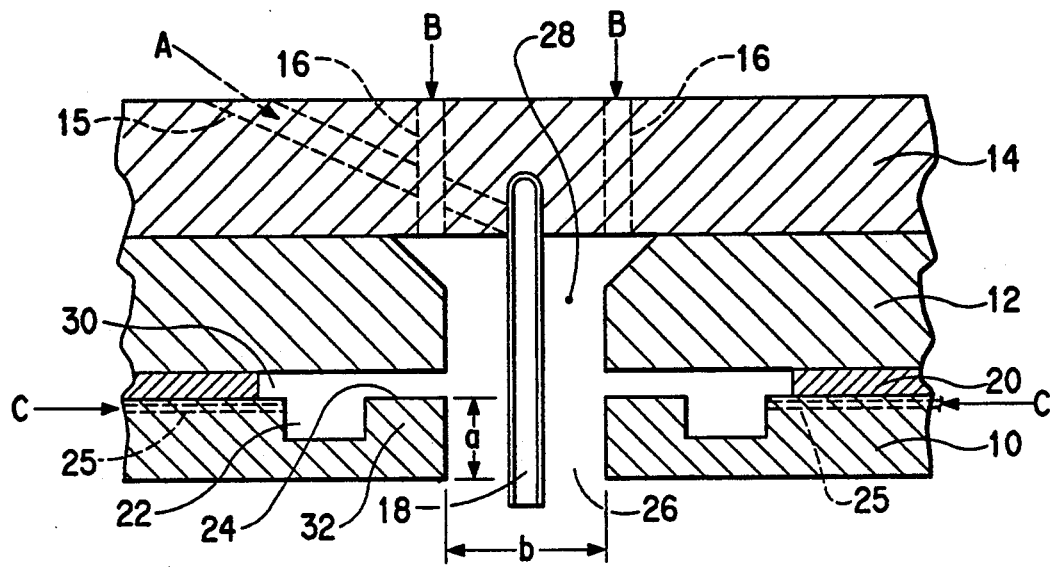
FIG. 1 shows a cross-sectional view of the improved spinnerette assembly.

Referring to FIG. 1, a generally cylindrical spinnerette assembly comprises a bottom plate or sheath plate 10 having an orifice 26, a middle plate or capillary plate 12 having a central aperture 28, and a top plate 14. The three plates 10, 12 and 14 may be retained by means known in the art, such as by a central housing (not shown) or by screws or bolts threaded into the plates (not shown). Top plate 14 has apertures 16. A capillary or tube 18 extends from top plate 14 into and through central aperture 28 and orifice 26, being substantially concentrically positioned in orifice 26. Except in the vicinity of shim 20, the sheath plate 10 and the middle plate 12 are separated from each other by a relatively unconstricted region 30 which forms a channel to supply the sheath material. The sheath material enters the unconstricted region 30 through channel 25. A recess 22 (also referred to as an annular distribution groove or a plateau groove) is provided in sheath plate 10. The recess 22 is adjacent to a plateau-like protrusion 32. The top surface of plateau 32 is generally referred to as a mesa 24. The height of plateau 24 may be constricted to meter the discharge of sheath material through channel 30.

The upper part of the spinnerette assembly (not shown) receives suitable piping or supply means to separately supply sheath material to channel 30, core material to apertures 16 and core fluid to capillary 18. In FIG. 1, the core fluid is supplied to capillary 18 through channel 15. Channel 30 and apertures 16 may be provided with distribution or filtering spaces as desired. Moreover, the size and shape of channel 30, aperture 16 and capillary 26 may be adjusted to influence the size and shape of the hollow fiber being produced.

The critical aspect of the invention is the location of channel 30 vis-a-vis orifice 26. In particular, the channel which introduces the sheath material C to the outer surface of the core material B must be in very close proximity to the fiber-forming orifice of the spinnerette. It has been determined through experimentation that the distance as shown in FIG. 1 from the bottom of sheath plate 10 to the bottom of channel 30 must be no more than one-half of the diameter b of orifice 26; i.e., the channel which supplies the sheath material C to the outer surface of the hollow fiber must be located at a distance from the orifice opening which is no more than one-half, preferably one-quarter to one-half, of the diameter of the orifice. Preferably, the orifice is circular; however, in the case of a non-circular orifice, the channel for the sheath material must be less than one-half of the orifices width (being the shortest distance across any part of the orifice). In one embodiment, for example, the diameter of the orifice is 1 mm and the sheath material is supplied by a channel which is located 0.5 mm from the opening of the orifice. Unlike prior art spinnerettes, the sheath material must be supplied at a point which is in close proximity to the point where the fiber-forming material and the bore fluid are extruded. Also, the sheath material is given less time to flow prior to the coagulation or solidification of the fiber.

In operation, a bore fluid A, preferably an inert gas such as nitrogen, is introduced through channel 15 to capillary 18 and forced through capillary 18. From there the bore fluid passes out of capillary 18 at point substantially adjacent to orifice 26. A core material B, usually a liquid polymer composition having fiber-forming properties, is introduced in an obvious manner to aperture 16 and is forced through central aperture 28. From there, the core material B passes through orifice 26 of the sheath plate 10. Upon extrusion from orifice 26 the core material B forms a self-supporting hollow fiber in the usual manner. Sheath material C, usually a liquid polymer composition, is introduced in an obvious manner through channel (or channels) 25 to channel 30. From there, the sheath material C passes out of channel 30 after having flowed over the top of plateau 32 to converge radially to the orifice 26 exit. Upon converging to the exit of orifice 26, the sheath material C forms a coating or sheath on the outside surface of the hollow fiber formed by core material B. Thus, a combined stream of the three liquids is caused to pass through the orifice with the sheath-forming liquid surrounding the core-forming liquid which surrounds the jet of bore fluid.

Figure 2:
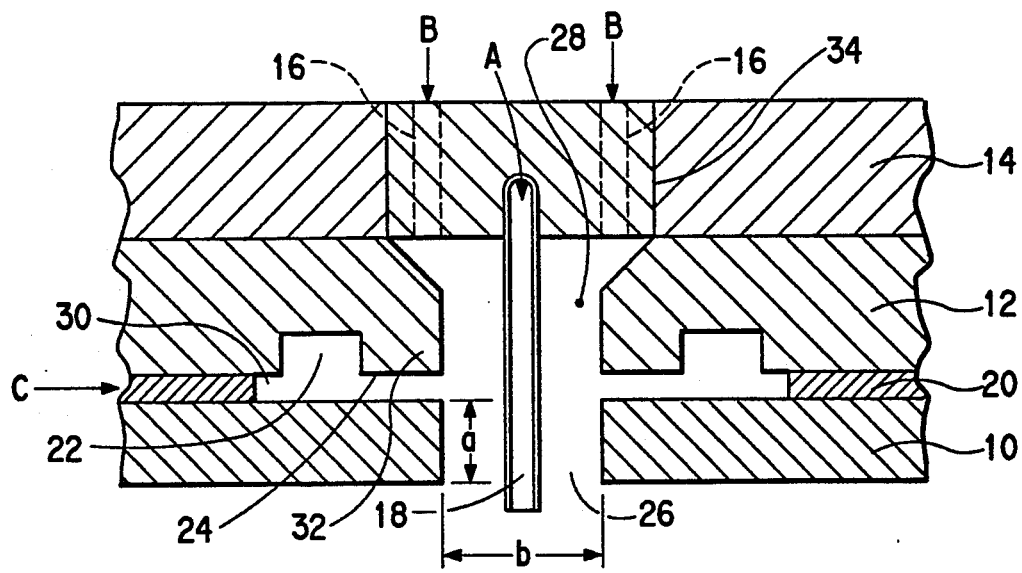
FIG. 2 shows a cross-sectional view of an alternate embodiment of the invention having a press-fit insert.

FIG. 2 shows an alternate embodiment of the invention in which the top plate is replaced with a press fit insert 34, having apertures 16. The capillary plate 12 is formed or machined by methods known in the art such that the press fit insert 34 fits tightly into the plate. The top end of the tube 18 is positioned in the press fit insert 34 so as to extend from the press fit insert 34 through central aperture 28 and orifice 26, being concentrically positioned in orifice 26. The press fit insert 34 facilitates disassembly and cleaning of the spinnerette, because it may be readily removed, cleaned and then replaced in the capillary plate 12 with the tube 18 continuing to be concentrically positioned in orifice 26.

FIG. 2 also shows the recess 22 extending upward rather than downward. The adjacent plateau 32 extends downward from the bottom face of the capillary plate 12 to restrict and meter the flow of sheath material C through channel 30. These elements replace the corresponding elements of FIG. 1 in an otherwise similar spinnerette assembly. Moreover, as shown in FIG. 1, the channel 30 must be located at a distance from the opening of the orifice 26 which is no more than one-half of the diameter of the orifice.

If desired, both sheath and capillary plates may have plateau-like protrusions to be located opposite one another in a spinnerette assembly. Furthermore, regardless of whether the plateaus appear on the sheath or the capillary plate, or both, liquid may be introduced into the relatively unconstricted region between the two plates from the side or an aperture in the other plate.

The proximity of the orifice to the point that the sheath core is supplied reduces the probability that the sheath material will be unevenly distributed on the exterior of the fiber-forming material. The layers of the components are substantially concentric. Moreover, multiple fibers are uniform in denier thickness and other characteristics of the sheath core.

What is claimed is:

1. A spinneret assembly comprising a sheath and a capillary plate which are spaced apart from but face each other so as to define a first channel therebetween, said first channel being adapted to communicate with a source of sheath-forming fluid, the sheath plate having an orifice channel extending therethrough, said extrusion channel having an orifice entrance and an orifice outlet, said orifice outlet having a width, at least one of the plates on its side facing the other plate being provided with a protrusion so as to constrict the first channel in a region surrounding the orifice entrance and thus cause streams of the sheath-forming fluid to converge radially towards the orifice entrance from all directions in a plane substantially perpendicular to the axis of the orifice channel, said extrusion channel adapted to communicate with a core-forming fluid, the first channel being communicated with the orifice channel at a point defined where a bottom of the first channel meets the orifice channel at the orifice entrance, and a distance from said point to the orifice outlet is less than one-half the width of the orifice outlet.

* * * * *

UNITED STATES PATENT AND TRADEMARK OFFICE
CERTIFICATE OF CORRECTION

PATENT NO. : 5,320,512

DATED : June 14, 1994

INVENTOR(S) : Samuel E. Moore, Sr.

It is certified that error appears in the above-identified patent and that said Letters Patent is hereby corrected as shown below:

On the title page,

Item [73] Assignee, please add -- and L'Air Liquide, S.A., Paris, France --.

Signed and Sealed this

Sixth Day of September, 1994

Attest:

BRUCE LEHMAN

*Attesting Officer*     *Commissioner of Patents and Trademarks*